United States Patent
Kolleth et al.

[11] Patent Number: 5,904,235
[45] Date of Patent: May 18, 1999

[54] SPREADER

[75] Inventors: Horst Kolleth, Duisburg; Jürgen Van De Löcht, Issum, both of Germany

[73] Assignee: Krupp Fordertechnik GmbH, Essen, Germany

[21] Appl. No.: 08/930,441
[22] PCT Filed: Feb. 28, 1997
[86] PCT No.: PCT/EP97/00977
   § 371 Date: Sep. 16, 1997
   § 102(e) Date: Sep. 16, 1997
[87] PCT Pub. No.: WO97/33819
   PCT Pub. Date: Sep. 18, 1997

[30] Foreign Application Priority Data

Mar. 14, 1996 [DE] Germany .......................... 196 09 943

[51] Int. Cl.$^6$ .............. B65G 21/10; A01C 19/00
[52] U.S. Cl. ............... 198/314; 198/861.3; 239/672
[58] Field of Search .................. 239/672, 674, 239/680; 198/300, 312, 313, 314, 861.3

[56] References Cited

U.S. PATENT DOCUMENTS 2,362,677  11/1944  Stephens .
4,245,732   1/1981  Couperus ............................ 198/313

FOREIGN PATENT DOCUMENTS

PA 388635    6/1950  Germany .
2 153 492   11/1972  Germany .
29 11 604    9/1980  Germany .
39 12 215 A1 10/1989  Germany .

*Primary Examiner*—Andres Kashnikow
*Assistant Examiner*—Sean P. O'Hanlon
*Attorney, Agent, or Firm*—Herbert Dubno

[57] ABSTRACT

A materials spreader for a plant for the continuous deposition of conveyable material, the substructure of which is supported on three support points and has a discharge jib. The support points of its substructure are designed as pontoons resting on the ground. A transport vehicle is provided underneath the substructure for moving the spreader. This transport vehicle is not permanently connected to the substructure.

6 Claims, 1 Drawing Sheet

SPREADER

CROSS REFERENCE TO RELATED APPLICATIONS

This application is a national stage of PCT/EP97/00977 filed Feb. 28, 1997 and based upon German national application 196 09 943.9 of Mar. 14, 1996 under the International Convention.

The invention relates to a spreader for a plant for continuously depositing conveyable material, whose substructure rests on three support points and which comprises a discharge jib.

BACKGROUND OF THE INVENTION

The known material spreaders of the aforesaid type rest on three support points consisting of crawler undercarriages. By means of these crawler undercarriages a spreader can be moved around. Crawler undercarriages are very expensive components. They are also very heavy and, as a result the known spreaders have a considerable weight. In the known spreaders the discharge jib is swingably mounted. The discharge level is relatively high.

OBJECT OF THE INVENTION

It is the object of the invention provide a material spreader which is considerably lighter and substantially more cost-effective than the above described known spreaders.

SUMMARY OF THE INVENTION

This object is attained with a materials spreader of the aforesaid type in which the support points of its substructure are designed as pontoons resting on the ground, a transport vehicle is provided underneath the substructure for the mobility of the spreader, and the transport vehicle is not permanently attached to the substructure.

The transport vehicle is able to position itself underneath any selected point under the substructure of the spreader, in order to lift and move the spreader. Because the spreader will usually remain at its selected location for a longer period of time, the transport vehicle may be employed elsewhere during that period, for example as a lifting, traction or relocation apparatus. If two or more spreaders are operated simultaneously, a single transport vehicle will be sufficient for all these spreaders.

The elimination of the plurality of crawler undercarriages results not only in a considerable weight reduction of the spreader of the invention, but also in an appreciable cost saving. A further cost advantage results from the alternative uses of the transport vehicle while the spreader is stationary and from the use of a single transport vehicle for two or more spreaders.

The spreader design according to the plurality of invention, as well as the elimination of the crawler undercarriages, translates into reduced construction height of the substructure of the spreader, which in turn leads to weight reduction.

In a preferred embodiment of the spreader according to the invention, the substructure of the spreader according to the invention consists essentially of a long transverse beam and a short transverse beam, these being interconnected by two spaced apart longitudinal beams and between the two transverse beams two struts are provided, which together with the transverse beams form a trapezoid.

As a result, the substructure of the spreader has adequate stability and the two longitudinal beams, which may take the form of box beams, provide secure support for the substructure on the transport vehicle.

Advantageously one pontoon is provided is fitted under each end of the long transverse beam and a single pontoon is provided under the short transverse beam. The size of the pontoons depends on the respective acceptable ground load.

In a further development of the invention a feed belt is provided between the two longitudinal beams of the substructure for conveying the supplied material to the conveyor belt of the discharge jib. This is made possible by the spacing of the two longitudinal beams. It is also possible to provide a continuous conveyor belt instead of the feed belt and the conveyor belt of the discharge jib which results in a simplified construction.

In a further development of the invention the conveyor belt of the discharge jib has a lesser width and revolves at a higher speed than the feed belt provided between the longitudinal beams of the substructure. This leads to a further weight reduction.

A further cost saving of the spreader of the invention is due to the fact that the discharge jib is nonrotationally mounted to the substructure. In order to turn the discharge jib, the spreader is lifted by means of the transport vehicle, whereafter the discharge jib is turned to the desired position together with the entire spreader.

In order to avoid difficulties when moving the spreader, the discharge jib is designed to be raised and lowered according to a further feature of the invention, a hydraulic cylinder is provided for raising and lowering the discharge jib. Instead of the hydraulic cylinder, it is possible to provide alternative means, for example a pulley block.

BRIEF DESCRIPTION OF THE DRAWING

The invention will be further explained with reference to the drawing in which an embodiment of the materials spreader according to the invention is schematically illustrated. In the drawing.

SPECIFIC DESCRIPTION

Figure 1:
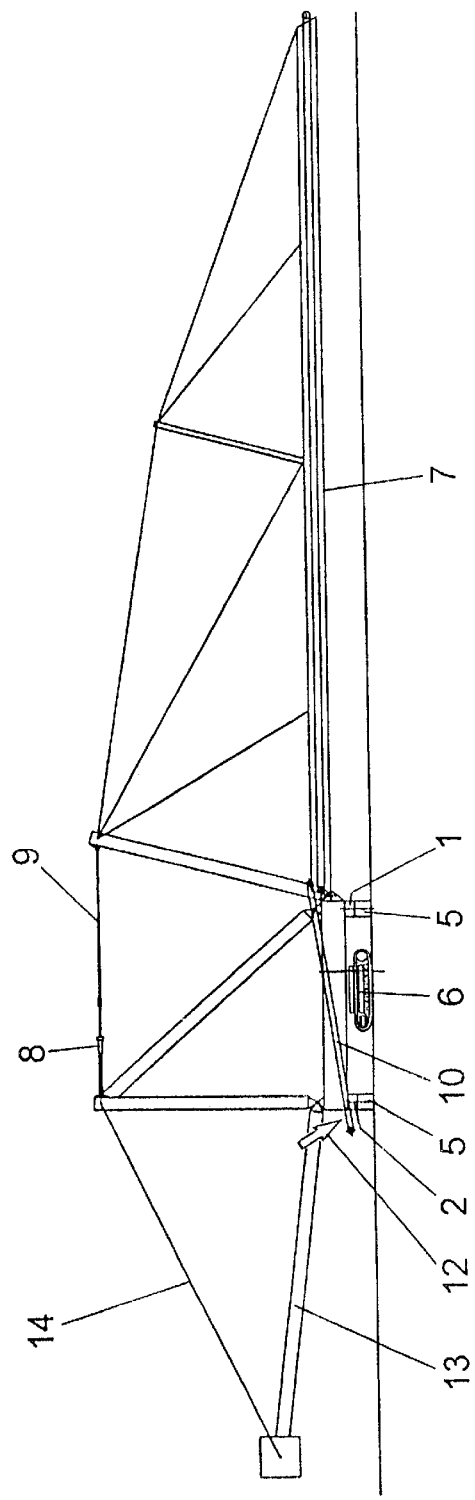
FIG. 1 is a side elevational view of a spreader according to the invention, and, FIG. 2 is a plan view of the spreader shown in FIG. 1.
Figure 2:
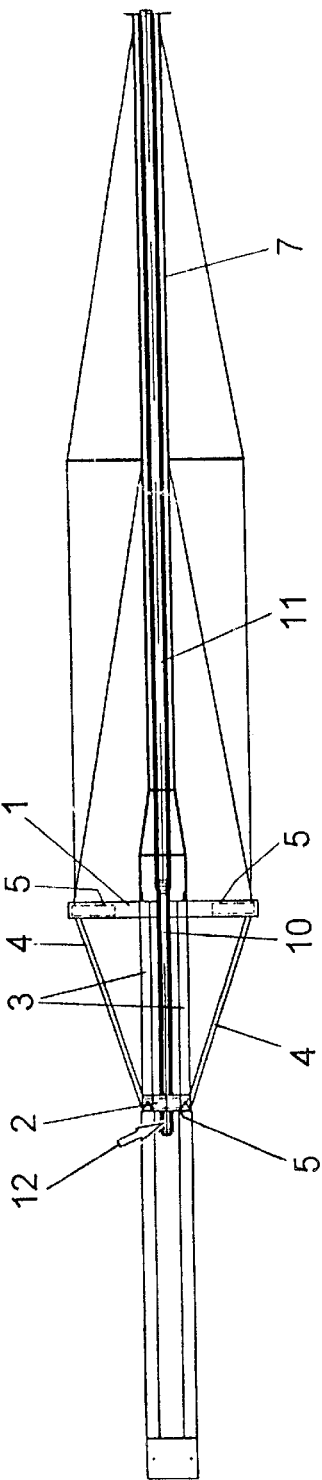

In the spreader illustrated in the drawing the substructure consists of a long transverse beam 1 and a short transverse beam 2, these being interconnected by two spaced apart longitudinal beams 3. Further between the two transverse beams 1 and 2, two struts 4 are provided. Together with the transverse beams 1 and 2, these struts 4 for a trapezoid. The substructure rests on three bases 5, one of them fitted under each end of the long transverse beam 1, while another is fitted under the short transverse beam 2. Underneath the substructure a transport vehicle 6 is provided, which serves for lifting and moving the spreader. By means of the transport vehicle 6, which is not connected to the substructure of the spreader and can be positioned therebeneath and removed as desired, the spreader may also be turned in its raised condition.

The spreader includes a discharge jib 7 which is nonrotationally mounted to the substructure. The turning of the discharge jib 7—jointly with the entire spreader—is performed by means of the transport vehicle 6. However the discharge jib is designed to be raised and lowered, whereby for raising and lowering the discharge jib a hydraulic cylinder 8, which cooperates with a traction member 9, is provided.

Between the two longitudinal beams 3 of the substructure, a feed belt 10 is arranged. The material to be spread is conveyed by the feed belt 10 to the conveyor belt 11 of the discharge jib 7. The material is picked up at that end of the feed belt 10, which is remote from the conveyor belt 11 of the discharge jib 7, at the material pickup location 12 indicated by an arrow. Feeding the material onto the feed belt 10 can be done by a face conveyor—not illustrated.

At its remote end from the discharge jib 7, the spreader comprises a ballast jib 13, including bracing means 14.

We claim:

1. A materials spreader for continuous deposition of a conveyable material, said spreader comprising:
    a substructure consisting essentially of:
        a long transverse beam,
        a short transverse beam horizontally spaced from and parallel to said long transverse beam,
        a pair of mutually parallel longitudinal beams connected to said transverse beams, perpendicular to said transverse beams and inwardly of ends of said long transverse beam, and
        respective struts connecting each of said ends of said long transverse beam with a respective end of said short transverse beam, said struts forming a trapezoid together with said transverse means;
    support means for supporting said spreader on the ground, said support means including:
        three bases including first and second bases beneath said ends of said long transverse beam and a third base beneath said short transverse beam;
    a discharge jib affixed to said substructure and movable therewith;
    means for conveying material to be spread to and along said discharge jib for spreading by the spreader; and
    a transport vehicle removably positioned beneath said substructure and not permanently connected thereto for displacing said spreader on the ground.

2. The spreader defined in claim 1 wherein said means for conveying includes a feed conveyor belt between said longitudinal beams, and a jib conveyor belt extending along said jib and receiving material from said feed conveyor belt.

3. The spreader defined in claim 2 wherein said jib conveyor belt has a smaller width and a higher speed than said feed conveyor belt.

4. The spreader defined in claim 2 wherein said jib is connected to said substructure nonrotationally with respect to a vertical axis.

5. The spreader defined in claim 2, further comprising means for raising and lowering said jib with respect to said substructure.

6. The spreader defined in claim 5 wherein said means for raising and lowering said jib with respect to said substructure includes a hydraulic cylinder.

* * * * *